(12) United States Patent
Blanton et al.

(10) Patent No.: US 9,319,077 B2
(45) Date of Patent: Apr. 19, 2016

(54) ACTIVE WAVEFORM SHUTTERING FOR ROTORCRAFT

(71) Applicant: The Boeing Company, Chicago, IL (US)

(72) Inventors: W. Brendan Blanton, Wilmington, DE (US); Thomas A. DuBois, Media, PA (US)

(73) Assignee: The Boeing Company, Chicago, IL (US)

( * ) Notice: Subject to any disclaimer, the term of this patent is extended or adjusted under 35 U.S.C. 154(b) by 425 days.

(21) Appl. No.: 13/744,124

(22) Filed: Jan. 17, 2013

(65) Prior Publication Data

US 2014/0199953 A1    Jul. 17, 2014

(51) Int. Cl.
*H04B 15/00* (2006.01)
*H04B 1/04* (2006.01)

(52) U.S. Cl.
CPC .............. *H04B 1/0475* (2013.01); *H04B 15/00* (2013.01)

(58) Field of Classification Search
CPC .................................................. H04B 7/18506
See application file for complete search history.

(56) References Cited

U.S. PATENT DOCUMENTS

| 5,606,734 | A | 2/1997 | Bahu |
| 6,448,924 | B1 | 9/2002 | Hafer |
| 2002/0068534 | A1* | 6/2002 | Ue et al. ........................... 455/92 |
| 2002/0105925 | A1* | 8/2002 | Shoemake .................... 370/330 |
| 2004/0090309 | A1* | 5/2004 | Taki et al. ..................... 340/10.1 |
| 2004/0150810 | A1* | 8/2004 | Muenter et al. .............. 356/5.01 |
| 2005/0115385 | A1* | 6/2005 | Rodriguez ............ F41H 13/005 89/1.11 |
| 2006/0255951 | A1* | 11/2006 | Roeder et al. .............. 340/572.7 |
| 2007/0257194 | A1* | 11/2007 | Mueller ..................... 250/341.8 |
| 2008/0006694 | A1* | 1/2008 | Hoffer et al. ................. 235/435 |
| 2010/0330926 | A1* | 12/2010 | Monk ......................... 455/67.15 |

OTHER PUBLICATIONS

Extended European Search Report for Application No. 14151650.0 dated Apr. 23, 2014, 6 pages.

* cited by examiner

*Primary Examiner* — Cindy Trandai
(74) *Attorney, Agent, or Firm* — Toler Law Group, PC

(57) ABSTRACT

In one embodiment a communication system comprises a radiofrequency (RF) transmitter, an antenna communicatively coupled to the RF transmitter to direct an RF signal in a first direction, a laser ranger mounted to the antenna to direct a pulsed laser signal in the first direction and receive reflected laser signals from a rotorblade, and logic to determine a measure of interference resulting from a rotorblade, provide the measure of interference to a radiofrequency (RF) transmitter, and shutter an RF transmission signal from the RF transmitter in response to the measure of interference. Other embodiments may be described.

20 Claims, 4 Drawing Sheets

ACTIVE WAVEFORM SHUTTERING FOR ROTORCRAFT

FIELD OF THE DISCLOSURE

This invention relates to electronic communication via radiofrequency (RF) signals, and more particularly to systems and methods for active waveform shuttering in rotorcraft.

BACKGROUND

Various vehicles rely on rotors to provide propulsion and/or lift. Common examples include helicopters, quadrotors, and propeller-driven aircraft. Other examples include fan boats, also referred to as air boats. Such vehicle may be referred to generally as rotorcraft.

Some rotorcraft may include RF communication systems. For example, most aircraft include both voice communication systems and data communication systems which rely on RF communication links to communication with one or more ground-based communication systems with other aircraft, or satellites. In some circumstances rotation of the rotors may introduce interference with RF signals transmitted from a rotorcraft. Such interference may vary as a function various parameters including the rotor speed, the aircraft orientation, transmission direction and the signal frequency. Accordingly, systems and methods mitigate such interference may find utility.

SUMMARY

In one embodiment there is provided a method comprising determining a measure of interference resulting from a rotorblade, providing the measure of interference to a radiofrequency (RF) modulator, and shuttering an RF transmission signal from the RF transmitter in response to the measure of interference.

In another embodiment there is provided a communication system comprising a radiofrequency (RF) transmitter, an antenna communicatively coupled to the RF transmitter to direct an RF signal in a first direction, a laser range finder mounted to the antenna to direct a pulsed laser signal in the first direction and receive reflected laser signals from a rotorblade, and logic to determine a measure of interference resulting from a rotorblade, provide the measure of interference to a radiofrequency (RF) transmitter, and shutter an RF transmission signal from the RF transmitter in response to the measure of interference.

In another embodiment there is provided an aircraft comprising a communication system comprising a radiofrequency (RF) transmitter, an antenna communicatively coupled to the RF transmitter to direct an RF signal in a first direction, a laser ranger mounted to the antenna to direct a pulsed laser signal in the first direction and receive reflected laser signals from a rotorblade, and logic to determine a measure of interference resulting from a rotorblade, provide the measure of interference to a radiofrequency (RF) transmitter, and shutter an RF transmission signal from the RF transmitter in response to the measure of interference.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

DETAILED DESCRIPTION

Described herein are exemplary systems and methods for active waveform modulation in rotorcraft. Embodiments described here provide systems, methods, and logic for determining a measure of interference resulting from a rotorblade, providing the measure of interference to a radiofrequency (RF) modulator, and shuttering an RF transmission signal from the RF transmitter in response to the measure of interference. As used herein the term "shuttering" refers to cycling a signal on and off In some embodiments an RF modulator may be used to shutter an RF signal. In alternate embodiments a transmitter may be cycled between a power on state and a power off state, or between a transmitting state and a non-transmitting state.

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
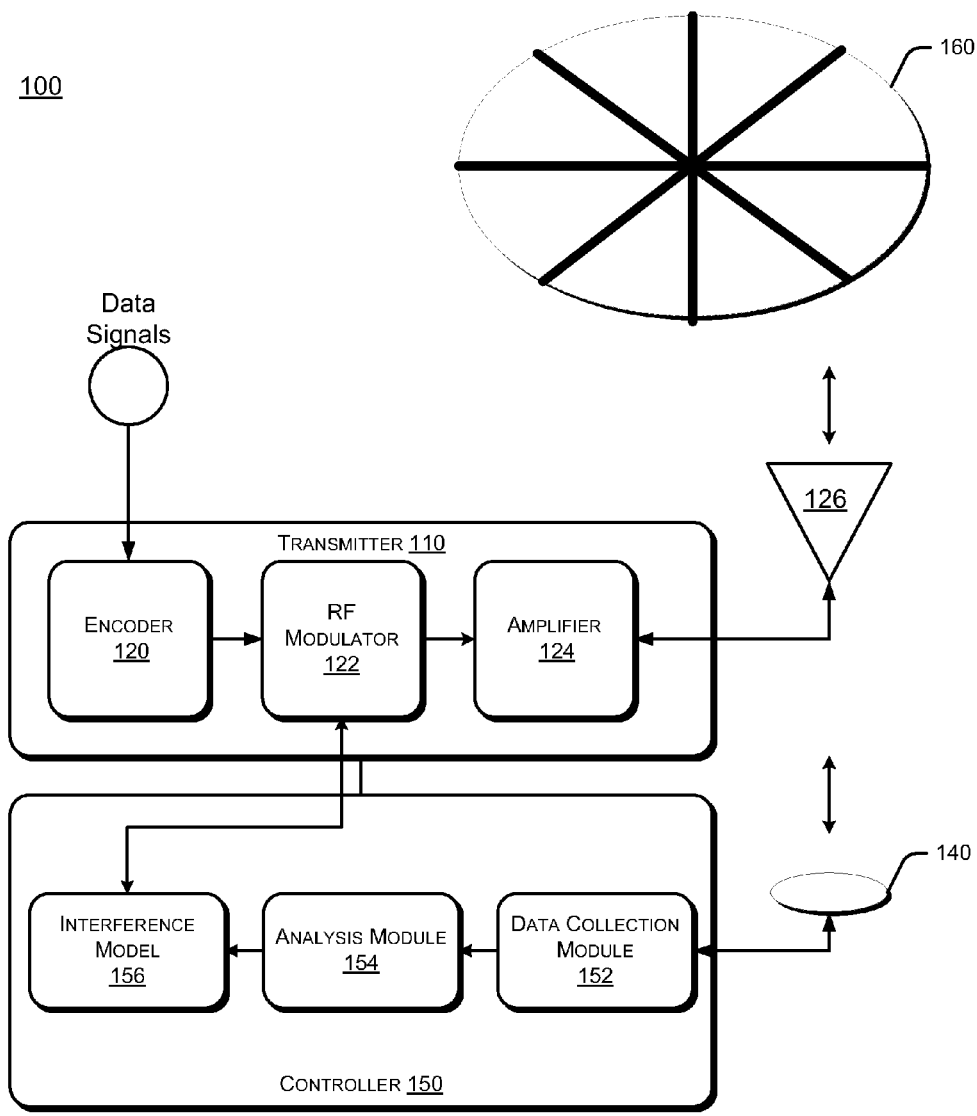
FIG. 1 is a schematic illustration of a system for active waveform modulation for rotorcraft, according to embodiments.

FIG. 1 is a schematic illustration of a system for active waveform modulation for rotorcraft, according to embodiments. Referring to FIG. 1, in one embodiment a system 100 comprises a radiofrequency (RF) transmitter 110, a controller 150 communicatively coupled to the transmitter 110, an antenna 126 for transceiving RF signals and a laser transceiver 140 for transceiving laser signals. One skilled in the art will recognize that an RF receiver may be associated with the RF transmitter 110 to establish an RF communication system.

Transmitter 110 comprises an encoder 120, an RF modulator 122, and an amplifier 124. Antenna 126 is coupled to transmitter 110. In operation, data signals may be input to the encoder, which encodes the data signals using any conventional encoding scheme. The encoded signals may be passed to the RF modulator 122, which modulates the signals, and to amplifier 124, which amplifiers the signals. The amplified signals may then be output to antenna 126 for transmission.

Laser transceiver 140 may be include a laser diode or other suitable source to generate a targeted laser output and a receiver to receive laser signals reflected from a rotor 160. In some embodiments the laser source may be adapted to transmit pulsed laser signals in a frequency range between 1.5 micrometers (um) and 7 u in the same direction in which the RF signals are transmitted. Laser transceiver 140 may include a photodiode or other suitable detector for detecting reflected laser signals. One skilled in the art will recognize that other detection devices may be used, e.g., RADAR, a visual sensor, a radio frequency identifier (RFID) device or the like.

Figure 2:
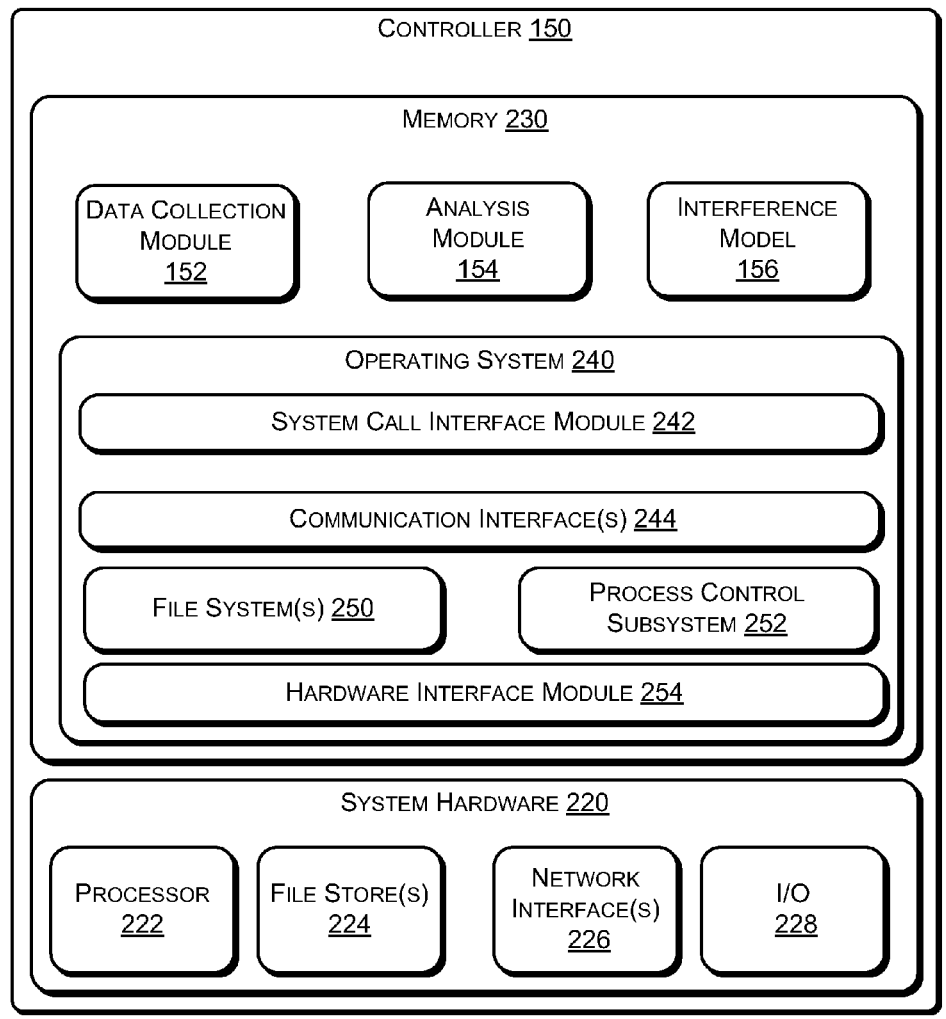
FIG. 2 is a schematic illustration of a controller in which portions of a system for active waveform modulation for rotorcraft may be implemented according to embodiments.

Controller 150 implements a data collection module 152 to collect data relating to the reflected laser signals collected by laser transceiver 140 and an analysis module 154 to analyze the collected signals to produce an interference model 156. In some embodiments controller 150 may be implemented as a computer-based processing device comprising one or more integrated circuits which implement logic operations. FIG. 2 is a schematic illustration of a controller 150 in which portions of a system for active waveform modulation for rotorcraft may be implemented according to embodiments.

Referring to FIG. 2, in one embodiment, controller 150 may include system hardware 220 and memory 230. System hardware 220 may include one or more processors 222, file store(s) 224, network interfaces 226, and an input/output (I/O) interface 228. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

File store(s) 224 may be internal to controller 150 such as, e.g., one or more hard drives, solid state memory, CD-ROM drives, DVD-ROM drives, or other types of storage devices. File store 280 may also be external to controller 150 such as, e.g., one or more external hard drives, network attached storage, or a separate storage network.

Network interface 226 may be implemented as a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

In one embodiment, input/output devices 228 may including a display having a screen, one or more speakers, a keyboard, a mouse, a touch screen, a voice-activated input device, a track ball, and any other device that allows the controller 150 to receive input from a user.

Memory 230 may be implemented as random access memory and/or read-only memory and may include an operating system 240 for managing operations of controller 150. In one embodiment, operating system 240 includes a hardware interface module 254 that provides an interface to system hardware 220. In addition, operating system 240 may include a file system 250 that manages files used in the operation of controller 150 and a process control subsystem 252 that manages processes executing on controller 150.

Operating system 240 may include (or manage) one or more communication interfaces that may operate in conjunction with system hardware 220 to transceive data packets and/or data streams from a remote source. Operating system 240 may further include a system call interface module 242 that provides an interface between the operating system 240 and one or more application modules resident in memory 230. Operating system 240 may be embodied as a UNIX operating system or any derivative thereof (e.g., Linux, Solaris, etc.) or as a Windows® brand operating system, real-time OS (RTOS), or other operating systems.

In one embodiment, memory 230 includes one or more logic modules embodied as logic instructions encoded on a tangible, non transitory memory to impart functionality to the controller 150. The embodiment depicted in FIG. 2 comprises a data collection module 152 and an analysis module 154, which generates an interference model 156. Additional details about the processes and operations implemented by these modules are described with reference to FIG. 3 below.

In operation, the controller 150 cooperates with the transmitter 110 to implement active waveform modulation in a rotorcraft. In a brief overview, in embodiments described herein, an RF transmitter 110 and controller 150 may be positioned within a rotorcraft. Antenna 126 and laser transceiver 140 may be positioned within the rotorcraft or outside the rotorcraft. In operation laser transceiver 140 directs a pulsed laser signal in the direction of the rotor(s) 160 and receives laser signals reflected from the rotor(s) 160 and converts the reflected signals to appropriate data signals. A data collection module 152 collects the data signals. The analysis module 154 processes the data signals to generate an interference model 156. Data from the interference model may be provided to the RF modulator 122, which uses the data to modulate an RF transmission signal.

Figure 3:
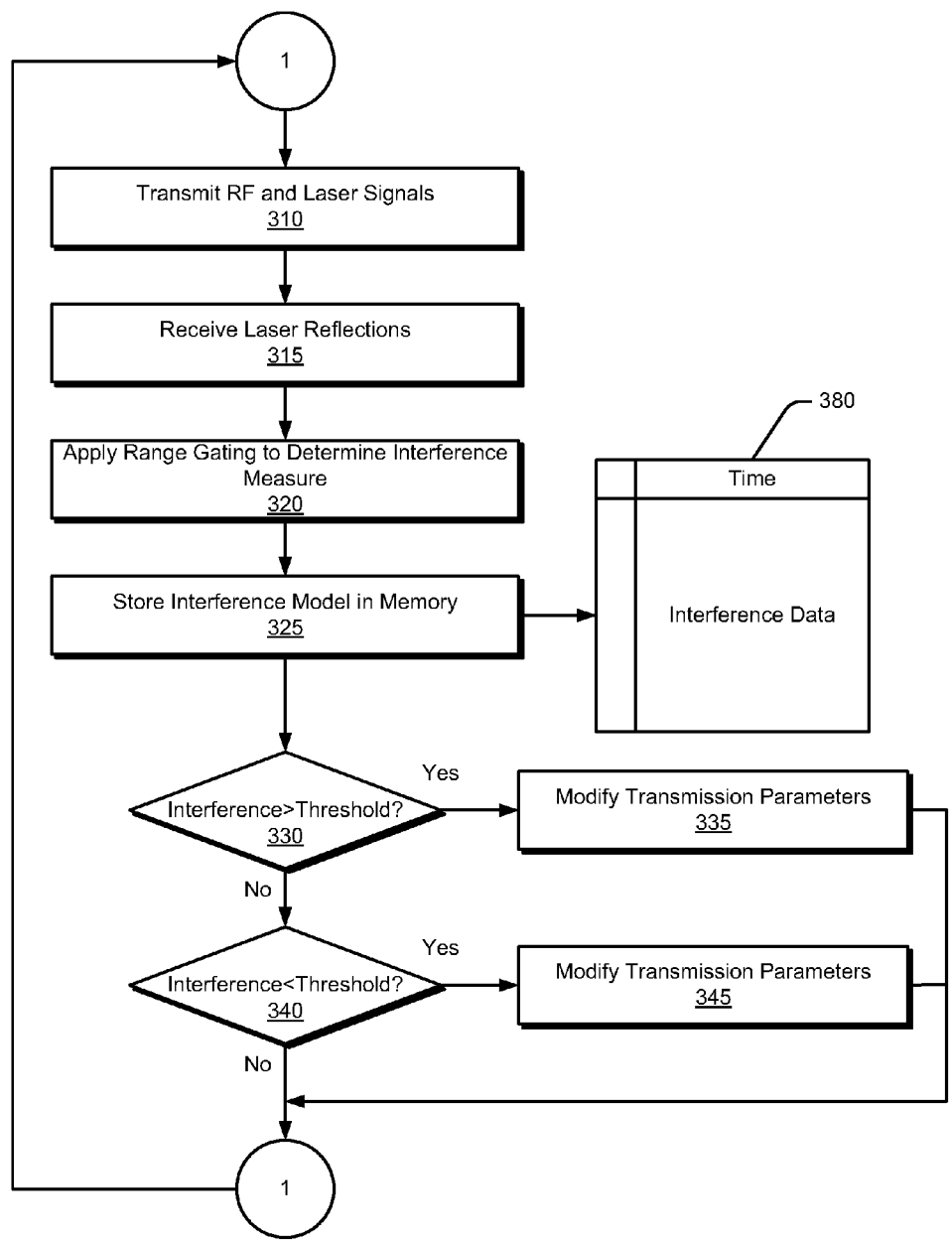
FIG. 3 is a flowchart illustrating operations in a method for active waveform modulation for rotorcraft, according to embodiments.

In greater detail, and referring to FIG. 3, in some embodiments a method for active waveform modulation includes at operation 310, transmitting RF signals from transmitter 110 and contemporaneously transmitting laser signals from laser transceiver 140. In some embodiments the laser transceiver transmits a laser signal pulsed at a frequency sufficiently high to resolve rotation of the rotors 160. At operation 315 the laser transceiver 140 receives reflections of the laser signal reflected from the rotors. The reflections are converted to appropriate electrical signals which are collected by the data collection module 152. At operation 320 analysis module 154 applies a range gating function to the signals to determine a measure of interference generated by the rotor 160. In some embodiments the measure of interference may be stored in a memory 230 at operation 325 as an interference model. By way of example, in some embodiments the interference model may comprise a time series of interference data collected from reflected laser signals.

In some embodiments the interference measure may be used to shutter and/or to modulate RF signals transmitted from transmitter 110. If at operation 330, if the interference measure exceeds a predetermined threshold, then control passes to operation 335 and one or more transmission parameters of the RF signal transmitted by transmitter are modified. By way of example, in some embodiments a data transmission rate of the RF signals transmitted from transmitter 110 may be decreased when the interference measure exceeds a threshold. In other embodiments a transmission power may be increased when the interference measure exceeds a threshold.

By contrast, if at operation 330 the interference measure does not exceed a threshold, then control passes to operation 340. If at operation 340 the interference measure falls below a predetermined threshold, then control passes to operation 345 and one or more transmission parameters of the RF signal transmitted by transmitter are modified. By way of example, in some embodiments a data transmission rate of the RF signals transmitted from transmitter 110 may be increased when the interference measure falls below a threshold. In other embodiments a transmission power may be decreased when the interference measure falls below a threshold.

Figure 4:
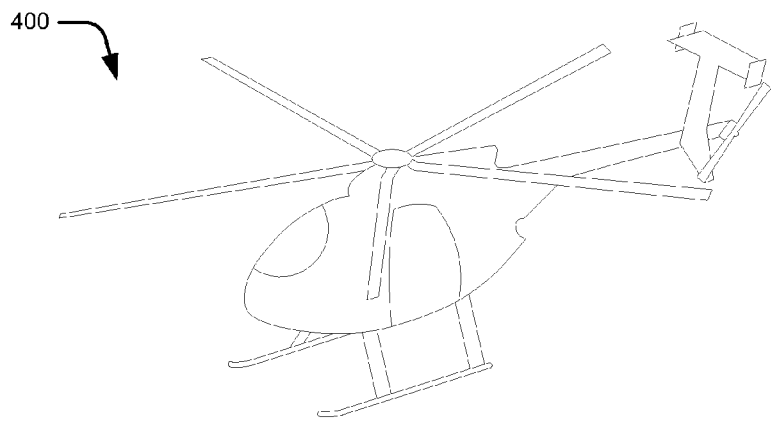
FIGS. 4 and 5 are schematic illustrations of aircraft in which a system for active waveform modulation for rotorcraft may be implemented according to embodiments.
Figure 5:
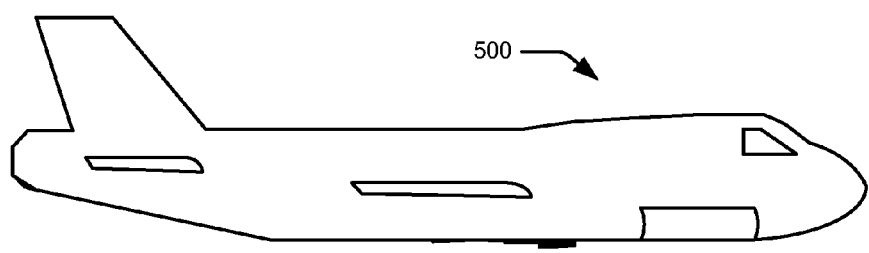

Thus, the operations 310-345 may be repeated in a loop to define a method for active waveform modulation in transmitter 110. The method may be implemented by the system 100 depicted in FIG. 1. In some embodiments the system 100 may be implemented on an aircraft such as a helicopter 400 depicted in FIG. 4 or an airplane 500 depicted in FIG. 5.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method, comprising:
   determining at an apparatus, a measure of interference indicating a degree to which a rotorblade interferes with an RF transmission signal being transmitted by an RF transmitter, the measure of interference based on reflected laser signals, wherein the reflected laser signals are generated from a pulsed laser signal reflected by the rotorblade;
   providing the measure of interference to a radiofrequency (RF) modulator; and shuttering the RF transmission signal for the RF transmitter based on the measure of interference.

2. The method of claim 1, wherein determining the measure of interference comprises:
   directing the pulsed laser signal toward the rotorblade; and
   evaluating the reflected laser signals to determine the measure of interference.

3. The method of claim 2, wherein directing the pulsed laser signal comprises transmitting the pulsed laser signal and the RF transmission signal contemporaneously.

4. The method of claim 2, wherein evaluating the reflected laser signals comprises applying a range gating function to the reflected laser signals.

5. The method of claim 1, further comprising constructing an interference model based on the reflected laser signals, wherein the interference model is a time series of interference data based on a plurality of measures of interference, and wherein the RF transmission signal is shuttered based on the interference model.

6. The method of claim 1, wherein shuttering the RF transmission signal comprises increasing a transmission rate of the RF transmission signal in response to the measure of interference falling below a threshold.

7. The method of claim 1, wherein shuttering the RF transmission signal comprises decreasing the transmission rate of the RF transmission signal in response to the measure of interference rising above the threshold.

8. A system, comprising:
   a radiofrequency (RF) transmitter;
   an antenna communicatively coupled to the RF transmitter to direct an RF signal in a first direction;
   a laser ranger mounted to the antenna, the laser ranger configured to:
      direct a pulsed laser signal in the first direction; and
      receive reflected laser signals from a rotorblade;
   logic to determine, based on the reflected laser signals, a measure of interference indicating a degree to which the rotorblade interferes with an RF transmission signal;
   logic to provide the measure of interference to the RF transmitter; and
   logic to shutter the RF transmission signal for the RF transmitter based on the measure of interference.

9. The system of claim 8, wherein the logic to determine the measure of interference evaluates the reflected laser signals to determine the measure of interference.

10. The system of claim 8, wherein the logic to determine the measure of interference applies a range gating function to the reflected laser signals.

11. The system of claim 8, further comprising logic to construct an interference model based on the reflected laser signals, wherein the interference model is a time series of interference data based on a plurality of measures of interference, and wherein the RF transmission signal is shuttered based on the interference model.

12. The system of claim 8, further comprising logic to increase a transmission rate of the RF transmission signal in response to the measure of interference falling below a threshold.

13. The system of claim 8, further comprising logic to decrease a transmission rate of the RF transmission signal in response to the measure of interference rising above a threshold.

14. An aircraft comprising:
a system, comprising:
   a radiofrequency (RF) transmitter;
   an antenna communicatively coupled to the RF transmitter to direct an RF signal in a first direction;
   a laser ranger mounted to the antenna, the laser ranger to:
      direct a pulsed laser signal in the first direction; and
      receive reflected laser signals from a rotorblade;
   logic to determine, based on the reflected laser signals, a measure of interference indicating a degree to which the rotorblade interferes with an RF transmission signal;
   logic to provide the measure of interference to the RF transmitter; and
   logic to shutter the RF transmission signal for the RF transmitter based on the measure of interference.

15. The aircraft of claim 14, wherein the logic to determine the measure of interference evaluates the reflected laser signals to determine the measure of interference.

16. The aircraft of claim 14, wherein the logic to determine the measure of interference applies a range gating function to the reflected laser signals.

17. The aircraft of claim 16, further comprising logic to construct an interference model based on the reflected laser signals, wherein the interference model is a time series of interference data based on a plurality of measures of interference, and wherein the RF transmission signal is shuttered based on the interference model.

18. The aircraft of claim 14, further comprising logic to increase a transmission rate of the RF transmission signal in response to the measure of interference falling below a threshold.

19. The aircraft of claim 14, further comprising logic to decrease a transmission rate of the RF transmission signal in response to the measure of interference rising above a threshold.

20. The aircraft of claim 14, further comprising logic to increase a transmission power of the RF transmission signal in response to the measure of interference rising above a threshold.

* * * * *